United States Patent
Yang

(10) Patent No.: US 11,306,027 B2
(45) Date of Patent: Apr. 19, 2022

(54) MIXED SHRINKAGE REDUCING AGENT FOR CONCRETE AND PREPARATION METHOD THEREOF

(71) Applicant: KELO STRUCTURE SELF WATERPROOF TECH SHENZHEN CO., LTD., Guangdong (CN)

(72) Inventor: Fei Yang, Guangdong (CN)

(73) Assignee: KELO STRUCTURE SELF WATERPROOF TECH SHENZHEN CO., Guangdon (CN)

( * ) Notice: Subject to any disclaimer, the term of this patent is extended or adjusted under 35 U.S.C. 154(b) by 0 days.

(21) Appl. No.: 17/168,277

(22) Filed: Feb. 5, 2021

(65) Prior Publication Data

US 2021/0371335 A1    Dec. 2, 2021

Related U.S. Application Data

(63) Continuation of application No. PCT/CN2021/070563, filed on Jan. 7, 2021.

(30) Foreign Application Priority Data

May 30, 2020    (CN) .......................... 202010480760.2

(51) Int. Cl.
| | | |
|---|---|---|
| *C04B 14/08* | (2006.01) | |
| *C04B 14/20* | (2006.01) | |
| *C04B 14/30* | (2006.01) | |
| *C04B 14/36* | (2006.01) | |
| *C04B 16/04* | (2006.01) | |
| *C04B 40/00* | (2006.01) | |
| *C04B 103/56* | (2006.01) | |
| *C04B 111/34* | (2006.01) | |

(52) U.S. Cl.
CPC ............ *C04B 14/08* (2013.01); *C04B 14/202* (2013.01); *C04B 14/304* (2013.01); *C04B 14/366* (2013.01); *C04B 16/04* (2013.01); *C04B 40/0039* (2013.01); *C04B 2103/58* (2013.01); *C04B 2111/34* (2013.01)

(58) Field of Classification Search
CPC ..... C04B 14/08; C04B 14/202; C04B 14/304; C04B 14/366; C04B 16/04; C04B 20/023; C04B 22/0013; C04B 22/16; C04B 24/06; C04B 24/38; C04B 28/02; C04B 40/0039; C04B 2103/58; C04B 2111/34
See application file for complete search history.

(56) References Cited

FOREIGN PATENT DOCUMENTS

| CN | 103864335 A | * | 6/2014 |
|---|---|---|---|
| CN | 104030596 A | * | 9/2014 |
| CN | 104591590 A | * | 5/2015 |
| CN | 108017319 A | * | 5/2018 |

* cited by examiner

*Primary Examiner* — Anthony J Green
(74) *Attorney, Agent, or Firm* — Cooper Legal Group, LLC

(57) ABSTRACT

Disclosed are a mixed shrinkage reducing agent for concrete and a preparation method thereof. The mixed shrinkage reducing agent for concrete includes the following components in parts by weight: 35-45 of alkali modified diatomite, 15-22 of magnesium oxide, 13-20 of vermiculite, 8-11 of borax, 3-9 of sodium hexametaphosphate, and 7-13 of citric acid modified starch. The mixed shrinkage reducing agent for concrete according to the present application is used as an admixture to be mixed into cement for preparing concrete.

16 Claims, No Drawings

MIXED SHRINKAGE REDUCING AGENT FOR CONCRETE AND PREPARATION METHOD THEREOF

CROSS-REFERENCE TO RELATED APPLICATION

The present application is a continuation of international PCT application serial No. PCT/CN2021/070563, filed on Jan. 7, 2021, which claims the priority benefit of China application No. 202010480760.2, filed on May 30, 2020. The entireties of international PCT application serial No. PCT/CN2021/070563 and China application No. 202010480760.2 are incorporated herein by reference and made a part of this specification.

BACKGROUND

Technical Field

The present application relates to the field of concrete, and more particularly, to a mixed shrinkage reducing agent for concrete and a preparation method thereof.

Description of Related Art

A concrete is an artificial stone material prepared from cement as a main cementitious material with proper amount of water, sand and stones and, if necessary, chemical additives and mineral admixture, by stirring uniformly, compactness molding and curing and hardening. The concrete is characterized by abundant raw materials, low price, and simple production process, as well as high compressive strength, good durability, wide range of strength grade, etc. for the products prepared therefrom. These characteristics provide the concrete with extremely wide range of application and increasing amount of consumption. Particularly, in recent years, with the rapid development of national economy and the continuous expansion of life and production activities, the construction of infrastructures is maintained at a high-speed development stage, for example, the construction of roads, railways, bridges, wharfs and tunnels in municipal traffic construction, building houses in urban civil construction engineering, and hydropower stations, dams and the like in large-scale engineering construction, all of which involves in the use of a large amount of concrete.

However, due to factors such as constituents of concrete and environmental influence, the concrete shrinks to different degrees during hardening and drying, and in severe cases, the concrete may suffer from dry cracking, shrinkage cracking, and water seepage, which may cause corrosion to the surface and inside of the concrete and corrosion of the steel bars inside the concrete, hinder the construction of concrete, impair the durability of the concrete, and significantly reduce the service life of the concrete engineering. Further, with the advent of high-performance concrete (HPC) and high-strength concrete (HSC), the amount of cement in the concrete increases, the amount of water used is decreased, and active admixture increases, leading to more widespread and extensive cracking.

In order to prevent cracking of concrete caused by drying and self-shrinkage, methods such as modifying cement components, incorporating synthetic or metal fibers, incorporating expansive agents, improving curing techniques, and incorporating shrinkage reducing agents are generally used to reduce the dry or shrinkage cracking of concrete, thereby improving the durability of concrete. The additives applied to the aspect of crack resistance in the market at present have two types of internal mixing doping and external coating. However, among them, if the shrinkage compensation time of the expansive agent is not synchronized with that of the concrete, it is difficult to achieve the purpose of compensating for shrinkage; the tensile strength of the concrete can be improved only by the fiber within a certain range, but the inside of the concrete still has larger stress, so that the generation of cracks cannot be thoroughly solved; most organic materials have poor compatibility with concrete inorganic materials, cannot fully exert corresponding functions, and are easy to age; the shrinkage reducing agent is one of better solutions to solve the problem of concrete shrinkage cracking at present, but still has great promotion space in terms of compressive strength, tensile strength, impermeability of concrete.

Therefore, there is still a need in the art to develop a shrinkage reducing agent capable of further improving the compressive strength, tensile strength, and impermeability of concrete.

SUMMARY

Technical Problem

In view of deficiencies present in the prior art, the present application provides a mixed seepage-control and crack-resistant shrinkage reducing agents for concrete, which is used as an admixture to be mixed with cement for preparing concrete, so that the working performance of fresh concrete can be fully improved, the shrinkage degree of the concrete during hardening can be reduced, and meanwhile, the compressive strength, the tensile strength, the hardness, the impermeability and the like of the hardened concrete can be greatly improved, thereby, the durability of a concrete workpiece can be greatly improved.

In a further aspect, the present application provides a preparation method of the mixed seepage-control and crack-resistant shrinkage reducing agents for concrete described above, which is simple and quick, suitable for industrial large-scale application.

Technical Solution

In an embodiment, the present application provides a mixed shrinkage reducing agent for concrete, which includes the following components in parts by weight:
35-45 of alkali modified diatomite,
15-22 of magnesium oxide,
13-20 of vermiculite,
8-11 of borax,
3-9 of sodium hexametaphosphate,
7-13 of citric acid modified starch.

In the present application, the mixed shrinkage reducing agent for concrete can improve the surface state of the concrete aggregate, so that the adhesive force of the cementitious material, namely cement, on the concrete aggregate is enhanced, thereby improving the interfacial bonding strength therebetween, and thus improving one of the weakest factors regarding the structural strength of the concrete. The mixed shrinkage reducing agent for concrete can further improve the fillability and flowability of cement, guide the cement deep into the gap of the aggregate itself, and overcome the mechanical weakness of the aggregate, so that the mechanical conduction of the concrete when subjected to force is more uniform, and the overall mechanical properties of the concrete is improved. Meanwhile, the better fillability and flowability of the cement greatly reduces the occurrence of gaps in an early stage of concrete hardening. In addition, mixed shrinkage reducing agent for concrete further has ion exchange performance, thus can adsorb and combine part of calcium ions, aluminum ions and the like, and release the same slowly during concrete hardening, so that the hardening speeds of the concrete before and after the hardening process is effectively balanced, the internal stress is reduced while the shrinkage of the concrete after hardening is greatly reduced, and the generation of cracks caused by stress release is avoided. The mixed shrinkage reducing agent for concrete according to the present application also adsorbs water molecules so as to slowly release water in the hardening process of concrete, promote the full crystallization and multiple hydration of cement and greatly improve the strength of the concrete.

Further, the mixed shrinkage reducing agent for concrete according to the present application preferably includes the following components in parts by weight:
40 of alkali modified diatomite,
19 of magnesium oxide,
17 of vermiculite,
10 of borax,
5 of sodium hexametaphosphate,
9 of citric acid modified starch.

In the present application, the mixed shrinkage reducing agent for concrete containing the above components in the proportion can have more excellent compressive strength, tensile strength, impermeability and the like.

The alkali modified diatomite is prepared by the following method:
dispersing diatomite in an aqueous alkaline solution having a pH of 10-11 and a volume of 5-10 times that of the diatomite, stirring at 40-50° C. for 20-30 minutes, and washing with water until the pH value is less than 8, and naturally drying.

Further, the aqueous alkaline solution can be prepared by dissolving at least one selected from KOH, NaOH, $Na_2CO_3$, or $K_2CO_3$ in water.

In the present application, there will be a large amount of active silicon sites and hydroxyl groups generated in the diatomite after being modified by alkali, which can sufficiently improve the efficacy of the shrinkage reducing agent for concrete, particularly effectively balance the hardening speeds of the concrete before and after the hardening process. Here, when the pH of the aqueous alkaline solution is greater than 11, the diatomite is greatly damaged due to too strong alkalinity, and when the pH of the aqueous alkaline solution is less than 10, the diatomite is difficult to be sufficiently modified due to too weak alkalinity, which has an influence on the shrinkage reducing performance and mechanical resistance of the concrete promoted by the shrinkage reducing agent for concrete according to the present application.

The citric acid modified starch is prepared by the following method:
dissolving citric acid in water to prepare a solution with a concentration of 10-15 wt %, adding starch to the solution by a weight ratio of starch to citric acid of 1:(0.6-0.9), leaving the solution to react at 70-90° C. for 120-150 minutes, filtering the solution to provide a filtering residue, and drying the filtering residue at 60-75° C. for 5-8 hours.

Further, the citric acid modified starch is preferably prepared by the following method:
dissolving citric acid in water to prepare a solution with a concentration of 12-13 wt %, adding starch to the solution by a weight ratio of starch to citric acid of 1:0.75, leaving the solution to react at 75-80° C. for 140-150 minutes, filtering the solution to provide a filtering residue, and drying the filtering residue at 70-75° C. for 6-7 hours.

In the present application, starch has a large amount of hydroxyl groups, and has a large amount of carboxyl groups and ester groups after being modified by citric acid, which can promote the surface state of the concrete aggregate improved by the shrinkage reducing agent, and improve the interfacial bonding strength of cement on the concrete aggregate. In addition, the citric acid modified starch also has a certain water reducing effect, so that the usage of the concrete water reducing agent can be reduced.

The mixed shrinkage reducing agent for concrete according to the present application further includes the following components in parts by weight: 1-3, preferably, 2 of calcium acetate. In the present application, the calcium acetate can further improve the performance of the mixed shrinkage reducing agent for concrete, and particularly improve the fillability and flowability of cement.

The particle size of the mixed shrinkage reducing agent for concrete according to the present application can be less than 40 μm, and preferably 10-40 μm. In the present application, the mixed shrinkage reducing agent for concrete with the above particle size can keep high activity and give full play to efficacy, and the above particle size range is close to that of cement, thereby being convenient for being fully mixed with the cement.

Another embodiment of the present application provides a preparation method of the mixed shrinkage reducing agent for concrete described above, which includes the steps of:
step 1, uniformly mixing alkali modified diatomite, magnesium oxide and the citric acid modified starch,
step 2, adding borax, sodium hexametaphosphate and vermiculite into the mixture obtained in step 1, fully mixing, and milling the mixture to a particle size of less than 40 μm, thereby preparing the mixed shrinkage reducing agent for concrete of the present application.

Further, the preparation method further includes: adding calcium acetate in step 2.

In the present application, the preparation method described above is simple and quick, and convenient for promotion.

Advantageous Effect

In summary, the embodiments of the present application have the following beneficial effects:
When the mixed shrinkage reducing agent for concrete according to the present application is used as an admixture to be mixed into cement for preparing concrete, the working performance of fresh concrete can be fully improved, the interfacial bonding strength of cement on the concrete aggregate, as well as the fillability and flowability of cement can be improved, the hardening speed of the concrete before and after the hardening process is balanced, the shrinkage degree of the concrete during hardening is greatly reduced, and meanwhile, the compressive strength, the tensile strength, the hardness, the impact energy, the impermeability and the like of the hardened concrete are greatly improved, thereby, the durability of a concrete workpiece is greatly improved.

Furthermore, the preparation method of the mixed shrinkage reducing agent for concrete according to the present application is simple and quick, and is suitable for industrial large-scale application.

DESCRIPTION OF THE EMBODIMENTS

For the purpose of better understanding the present application by a person skilled in the art, the present application will be further described below in detail with reference to embodiments, but it should be understood that, the following embodiments are merely preferred embodiments of the present application, and the scope of protection claimed by the present application is not limited thereto.

Sources of Materials

Diatomite, available from Guangzhou Yikang New Material Science & Technology Co., Ltd., Sodium hydroxide, available from Jining Bocheng Chemical Co., Ltd., Magnesium oxide, available from Wuxi Zehui Chemical Industry Co., Ltd., Vermiculite, available from Hebei Chuangtian Engineering Material Co., Ltd., Borax, available from Qinan Qihang Chemical Technology Co., Ltd., Sodium hexametaphosphate, available from Suzhou Xinshengyuan Chemical Technology Co., Ltd., Citric acid, available from Suzhou Guangyou Chemical Co., Ltd., Starch, available from Jinan Duanxing Chemical Technology Co., Ltd., and Calcium acetate, available from Jinan Binqi Chemical Co., Ltd.

EXAMPLE

Example 1

The following preparation method according to the present application was used to prepare a mixed seepage-control and crack-resistant shrinkage reducing agent for concrete: step 1, 40 parts by weight of alkali modified diatomite, 19 parts by weight of magnesium oxide and 9 parts by weight of the citric acid modified starch were uniformly mixed, step 2, 10 parts by weight of borax, 5 parts by weight of sodium hexametaphosphate and 17 parts by weight of vermiculite were added into the mixture obtained in step 1, fully mixed, and milled to a particle size of 20-30 μm, In particular, the alkali modified diatomite was prepared by the following method: diatomite was dispersed in an aqueous solution of sodium hydroxide with a pH of 10 in a volume of 7 times, stirred at 45° C. for 25 minutes, and washed with water until the pH value is less than 8, and naturally dried.

The citric acid modified starch was prepared by the following method:
citric acid was dissolved in water to prepare a solution with a concentration of 12.5 wt %, starch was added by a weight ratio of starch to citric acid of 1:0.75, and the solution was left to react at 77° C. for 145 minutes, and filtered to provide a filtering residue which was dried at 73° C. for 6.5 hours.

Thereby, the mixed seepage-control and crack-resistant-shrinkage reducing agent for concrete according to the present application was prepared.

Example 2

The following preparation method according to the present application was used to prepare a mixed seepage-control and crack-resistant shrinkage reducing agent for concrete: step 1, 35 parts by weight of alkali modified diatomite, 22 parts by weight of magnesium oxide and 7 parts by weight of the citric acid modified starch were uniformly mixed, step 2, 11 parts by weight of borax, 3 parts by weight of sodium hexametaphosphate and 20 parts by weight of vermiculite were added into the mixture obtained in step 1, fully mixed, and milled to a particle size of 20-30 μm.

In particular, the alkali modified diatomite was prepared by the following method: diatomite was dispersed in an aqueous solution of sodium hydroxide with a pH of 11 in a volume of 5 times, stirred at 40° C. for 30 minutes, and washed with water until the pH value is less than 8, and naturally dried.

The citric acid modified starch was prepared by the following method:
citric acid was dissolved in water to prepare a solution with a concentration of 12 wt %, starch was added by a weight ratio of starch to citric acid of 1:0.75, and the solution was left to react at 80° C. for 140 minutes and filtered to provide a filtering residue which was dried at 75° C. for 6 hours.

Thereby, the mixed seepage-control and crack-resistant shrinkage reducing agent for concrete according to the present application was prepared.

Example 3

The following preparation method according to the present application was used to prepare a mixed seepage-control and crack-resistant shrinkage reducing agent for concrete:
step 1, 45 parts by weight of alkali modified diatomite, 15 parts by weight of magnesium oxide and 13 parts by weight of the citric acid modified starch were uniformly mixed,
step 2, 8 parts by weight of borax, 9 parts by weight of sodium hexametaphosphate and 13 parts by weight of vermiculite were added into the mixture obtained in step 1, fully mixed, and milled to a particle size of 20-30 μm.

In particular, the alkali modified diatomite was prepared by the following method: diatomite was dispersed in an aqueous solution of sodium hydroxide with a pH of 10 in a volume of 10 times, stirred at 50° C. for 20 minutes, and washed with water until the pH value is less than 8, and naturally dried.

The citric acid modified starch was prepared by the following method:
citric acid was dissolved in water to prepare a solution with a concentration of 13 wt %, starch was added by a weight ratio of starch to citric acid of 1:0.75, and the solution was left to react at 75° C. for 150 minutes and filtered to provide a filtering residue which was dried at 70° C. for 7 hours.

Thereby, the mixed seepage-control and crack-resistant shrinkage reducing agent for concrete according to the present application was prepared.

Example 4

The following preparation method according to the present application was used to prepare a mixed seepage-control and crack-resistant shrinkage reducing agent for concrete:
step 1, 42 parts by weight of alkali modified diatomite, 21 parts by weight of magnesium oxide and 8 parts by weight of the citric acid modified starch were uniformly mixed,
step 2, 9 parts by weight of borax, 7 parts by weight of sodium hexametaphosphate and 18 parts by weight of vermiculite were added into the mixture obtained in step 1, fully mixed, and milled to a particle size of 10-20 μm.

In particular, the alkali modified diatomite was prepared by the following method:
diatomite was dispersed in an aqueous solution of sodium hydroxide with a pH of 11 in a volume of 8 times, stirred at 45° C. for 23 minutes, and washed with water until the pH value is less than 8, and naturally dried.

The citric acid modified starch was prepared by the following method:
citric acid was dissolved in water to prepare a solution with a concentration of 10 wt %, starch was added by a weight ratio of starch to citric acid of 1:0.9, and the solution was left to react at 70° C. for 150 minutes and filtered to provide a filtering residue which was dried at 60° C. for 8 hours.

Thereby, the mixed seepage-control and crack-resistant shrinkage reducing agent for concrete agent according to the present application was prepared.

Example 5

The following preparation method according to the present application was used to prepare a mixed seepage-control and crack-resistant shrinkage reducing agent for concrete:
step 1, 37 parts by weight of alkali modified diatomite, 17 parts by weight of magnesium oxide and 11 parts by weight of the citric acid modified starch were uniformly mixed,
step 2, 11 parts by weight of borax, 4 parts by weight of sodium hexametaphosphate and 15 parts by weight of vermiculite were added into the mixture obtained in step 1, fully mixed, and milled to a particle size of 30-40 μm.

In particular, the alkali modified diatomite was prepared by the following method:
diatomite was dispersed in aqueous solution of sodium hydroxide with a pH of 10 in a volume of 8 times, stirred at 40° C. for 27 minutes, and washed with water until the pH value is less than 8, and naturally dried.

The citric acid modified starch was prepared by the following method:
citric acid was dissolved in water to prepare a solution with a weight concentration of 15%, starch was added by a weight ratio of starch to citric acid of 1:0.6, and the solution was reacted at 90° C. for 120 minutes and filtered to provide a filtering residue which was dried at 75° C. for 5 hours.

Thereby, the mixed seepage-control and crack-resistant shrinkage reducing agent for concrete according to the present application was prepared.

Example 6

The following preparation method according to the present application was used to prepare a mixed seepage-control and crack-resistant shrinkage reducing agent for concrete:
step 1, 40 parts by weight of alkali modified diatomite, 19 parts by weight of magnesium oxide and 9 parts by weight of the citric acid modified starch were uniformly mixed,
step 2, 10 parts by weight of borax, 5 parts by weight of sodium hexametaphosphate, 17 parts by weight of vermiculite and 2 parts by weight of calcium acetate were added into the mixture obtained in step 1, fully mixed, and milled to a particle size of 20-30 μm.

In particular, the alkali modified diatomite was prepared by the following method:
diatomite was dispersed in an aqueous solution of sodium hydroxide with a pH of 10 in a volume of 7 times, stirred at 45° C. for 25 minutes, and washed with water until the pH value is less than 8, and naturally dried.

The citric acid modified starch was prepared by the following method:
citric acid was dissolved in water to prepare a solution with a concentration of 12.5 wt %, starch was added by a weight ratio of starch to citric acid of 1:0.75, and the solution was left to react at 77° C. for 145 minutes and filtered to provide a filtering residue which was dried at 73° C. for 6.5 hours.

Thereby, the mixed seepage-control and crack-resistant shrinkage reducing agent for concrete according to the present application was prepared.

Example 7

The following preparation method according to the present application was used to prepare a mixed seepage-control and crack-resistant shrinkage reducing agent for concrete:
step 1, 35 parts by weight of alkali modified diatomite, 22 parts by weight of magnesium oxide and 7 parts by weight of the citric acid modified starch were uniformly mixed,
step 2, 11 parts by weight of borax, 3 parts by weight of sodium hexametaphosphate, 20 parts by weight of vermiculite and 1 part by weight of calcium acetate were added into the mixture obtained in step 1, fully mixed, and milled to a particle size of 20-30 μm.

In particular, the alkali modified diatomite was prepared by the following method:
diatomite was dispersed in an aqueous solution of sodium hydroxide with a pH of 10 in a volume of 9 times, stirred at 40° C. for 25 minutes, and washed with water until the pH value is less than 8, and naturally dried.

The citric acid modified starch was prepared by the following method:
citric acid was dissolved in water to prepare a solution with a concentration of 12 wt %, starch was added by a weight ratio of starch to citric acid of 1:0.6, the solution was left to react at 80° C. for 150 minutes and filtered to provide a filtering residue which was dried at 70° C. for 6 hours.

Thereby, the mixed seepage-control and crack-resistant shrinkage reducing agent for concrete according to the present application was prepared.

Example 8

The following preparation method according to the present application was used to prepare a mixed seepage-control and crack-resistant shrinkage reducing agent for concrete:
step 1, 45 parts by weight of alkali modified diatomite, 15 parts by weight of magnesium oxide and 13 parts by weight of the citric acid modified starch were uniformly mixed,
step 2, 8 parts by weight of borax, 9 parts by weight of sodium hexametaphosphate, 13 parts by weight of vermiculite and 3 parts by weight of calcium acetate were added into the mixture obtained in step 1, fully mixed, and milled to a particle size of 20-30 μm.

In particular, the alkali modified diatomite was prepared by the following method:
diatomite was dispersed in an aqueous solution of sodium hydroxide with a pH of 11 in a volume of 6 times, stirred at 50° C. for 25 minutes, and washed with water until the pH value is less than 8, and naturally dried.

The citric acid modified starch was prepared by the following method:
citric acid was dissolved in water to prepare a solution with a weight concentration of 13%, starch was added by a weight ratio of starch to citric acid of 1:0.9, and the solution was left to react at 75° C. for 140 minutes and filtered to provide a filtering residue which was dried at 75° C. for 7 hours.

Thereby, the mixed seepage-control and crack-resistant shrinkage reducing agent for concrete according to the present application was prepared.

Comparative Example 1

A mixed seepage-control and crack-resistant shrinkage reducing agent for concrete was prepared in the same way as in Example 1, except that 30 parts by weight of alkali modified diatomite, 27 parts by weight of magnesium oxide, 4 parts by weight of the citric acid modified starch, 16 parts by weight of borax, 1 part by weight of sodium hexametaphosphate, and 25 parts by weight of vermiculite were used.

Comparative Example 2

A mixed seepage-control and crack-resistant shrinkage reducing agent for concrete was prepared in the same way as in Example 1, except that 50 parts by weight of alkali modified diatomite, 10 parts by weight of magnesium oxide, 18 parts by weight of the citric acid modified starch, 4 parts by weight of borax, 13 parts by weight of sodium hexametaphosphate, and 8 parts by weight of vermiculite were used.

Comparative Example 3

A mixed seepage-control and crack-resistant shrinkage reducing agent for concrete was prepared in the same way as in Example 1, except that the alkali modified diatomite was prepared from an aqueous solution of sodium hydroxide with a pH of 12.

Comparative Example 4

A mixed seepage-control and crack-resistant shrinkage reducing agent for concrete was prepared in the same way as in Example 1, except that the alkali modified diatomite was prepared from an aqueous solution of sodium hydroxide with a pH of 9.

Comparative Example 5

A mixed seepage-control and crack-resistant shrinkage reducing agent for concrete was prepared in the same way as in Example 1, except that citric acid was dissolved in water to prepare a solution with a concentration of 20 wt %, starch was added by a weight ratio of starch to citric acid of 1:0.4, and the solution was left to react at 95° C. for 100 minutes and filtered to provide a filtering residue which was dried at 73° C. for 6.5 hours, to prepare the citric acid modified starch.

Comparative Example 6

A mixed seepage-control and crack-resistant shrinkage reducing agent for concrete was prepared in the same way as in Example 1, except that citric acid was dissolved in water to prepare a solution with a weight concentration of 5%, starch was added by a weight ratio of starch to citric acid of 1:1.5, and the solution was left to react at 60° C. for 180 minutes and filtered to provide a filtering residue which was dried at 73° C. for 6.5 hours, to prepare the citric acid modified starch.

Test Example

The mixed seepage-control and crack-resistant shrinkage reducing agents for concrete prepared in Examples 1 to 8 and Comparative Examples 1 to 6 of the present application were tested for their performance. Specifically, 650 parts by weight of P•O 42.5 ordinary Portland cement and 10 parts by weight of mixed seepage-control and crack-resistant shrinkage reducing agent for concrete are uniformly mixed, and then 700 parts by weight of crushed stone, 450 parts by weight of river sand, 4 parts by weight of polycarboxylic acid water reducing agent and 80 parts by weight of water are added to prepare a standard test piece; furthermore, a reference standard test piece was prepared in the same manner as those described above, except that the mixed seepage-control and crack-resistant shrinkage reducing agents for concrete prepared in examples or comparative examples were not added. The standard test pieces were cured at room temperature for 28 days and subjected to corresponding performance tests, and the results are shown below.

The following Table 1 shows the performances, such as the compressive strength, tensile strength, Mohs hardness, water permeation height, impermeability mark and the electric flux of the reference test piece, test pieces corresponding to examples 1 to 8, and comparative examples 1 to 6 after curing for 28 days.

TABLE 1

| Standard test piece | Compressive strength/ MPa | Tensile strength/ MPa | Mohs hardness | Water permeation height/cm | Impact energy/ J | Impermeability mark | Electric flux |
|---|---|---|---|---|---|---|---|
| Example 1 | 68.3 | 28.2 | 6.5 | 4.5 | 1320 | S12 | 625 |
| Example 2 | 65.2 | 28.0 | 6.5 | 4.0 | 1330 | S12 | 640 |
| Example 3 | 66.8 | 27.4 | 6.0 | 4.5 | 1320 | S12 | 665 |
| Example 4 | 63.2 | 26.8 | 6.0 | 5.5 | 1310 | S12 | 605 |
| Example 5 | 62.4 | 26.4 | 5.5 | 3.5 | 1300 | S12 | 680 |
| Example 6 | 71.7 | 28.6 | 6.5 | 4.0 | 1320 | S12 | 632 |
| Example 7 | 69.8 | 27.8 | 6.0 | 3.5 | 1340 | S12 | 667 |
| Example 8 | 70.1 | 28.2 | 6.5 | 4.0 | 1330 | S12 | 642 |
| Reference | 53.8 | 21.2 | 5.0 | 9.5 | 1030 | S12 | 952 |
| (Comparative Example 1) | 58.2 | 23.4 | 5.5 | 6.0 | 1090 | S10 | 895 |
| (Comparative Example 2) | 52.3 | 22.5 | 5.0 | 4.5 | 980 | S12 | 670 |
| (Comparative Example 3) | 47.6 | 25.1 | 6.0 | 7.0 | 1020 | S11 | 658 |
| (Comparative Example 4) | 60.1 | 24.3 | 5.0 | 5.5 | 1190 | S9 | 751 |
| (Comparative Example 5) | 55.2 | 22.4 | 5.0 | 6.5 | 1250 | S12 | 724 |
| (Comparative Example 6) | 51.1 | 23.9 | 5.5 | 4.5 | 1160 | S11 | 804 |

Referring to Table 1 above, it can be seen that the concrete standard test pieces using the mixed seepage-control and crack-resistant shrinkage reducing agents for concrete in Examples 1 to 8 of the present application have higher compressive strength, tensile strength, Mohs hardness, impact energy, impermeability mark, etc., and also have a lower water permeation height, compared to the reference test pieces, which indicates that the seepage control and crack resistance shrinkage reducing agent of the present application can comprehensively improve the mechanical properties and impermeability of concrete, thereby greatly improving the durability of concrete workpieces. In contrast, the concrete standard test pieces using the seepage-control and crack-resistant shrinkage reducing agents for concrete prepared in comparative examples beyond the limited range of the present application have significantly inferior properties to those of the reference test pieces, although they are improved as compared to the reference test pieces.

The shrinkage values ($\times 10^{-6}$) after curing for 3 days, 7 days, 16 days, 28 days, 56 days and 90 days are shown in Table 2 below for the reference test pieces, in Examples 1 to 8 and Comparative Examples 1 to 6.

TABLE 2

| Standard test piece | 3 days | 7 days | 16 days | 28 days | 56 days | 90 days |
| --- | --- | --- | --- | --- | --- | --- |
| Example 1 | 14.3 | 42.1 | 93.5 | 168 | 189 | 201 |
| Example 2 | 15.2 | 44.8 | 94.2 | 173 | 192 | 203 |
| Example 3 | 14.9 | 43.9 | 96.7 | 171 | 187 | 200 |
| Example 4 | 15.7 | 46.7 | 95.9 | 178 | 195 | 204 |
| Example 5 | 16.0 | 46.4 | 96.1 | 180 | 194 | 204 |
| Example 6 | 14.5 | 41.9 | 93.2 | 170 | 190 | 199 |
| Example 7 | 14.1 | 42.5 | 92.4 | 177 | 193 | 201 |
| Example 8 | 14.9 | 43.2 | 94.3 | 175 | 191 | 200 |
| Reference | 62.3 | 98.5 | 213 | 310 | 361 | 388 |
| (Comparative Example 1) | 28.2 | 53.2 | 135 | 268 | 323 | 339 |
| (Comparative Example 2) | 23.1 | 60.7 | 125 | 271 | 330 | 345 |
| (Comparative Example 3) | 31.5 | 55.9 | 140 | 255 | 319 | 331 |
| (Comparative Example 4) | 18.5 | 48.5 | 139 | 264 | 304 | 315 |
| (Comparative Example 5) | 22.7 | 53.3 | 115 | 245 | 299 | 224 |
| (Comparative Example 6) | 15.7 | 44.5 | 151 | 285 | 350 | 374 |

Referring to Table 2 above, it can be seen that the concrete standard test pieces using the mixed seepage-control and crack-resistant shrinkage reducing agents for concrete in Examples 1 to 8 of the present application are very significantly decreased within 90 days of hardening, compared to the reference test pieces, indicating that the seepage control and crack resistance shrinkage reducing agent according to the present application can effectively reduce the shrinkage of concrete. In contrast, the shrinkage of the concrete test pieces using the seepage-control and crack-resistant shrinkage reducing agents for concrete prepared in the comparative examples, beyond the limited range of the present application is not significantly reduced as compared to the present application, although it is reduced to some extent.

These embodiments are merely explanatory and are not restrictive of the application. After reading this specification, those skilled in the art can make various modifications to the embodiments as needed without creative work, which falls within the protection scope defined by the appended patent claims.

What is claimed is:

1. A mixed shrinkage reducing agent for concrete, comprising the following components in parts by weight:
   35-45 of alkali modified diatomite,
   15-22 of magnesium oxide,
   13-20 of vermiculite,
   8-11 of borax,
   3-9 of sodium hexametaphosphate, and
   7-13 of citric acid modified starch.

2. The mixed shrinkage reducing agent for concrete according to the claim 1, comprising the following components in parts by weight:
   40 of alkali modified diatomite,
   19 of magnesium oxide,
   17 of vermiculite,
   10 of borax,
   5 of sodium hexametaphosphate, and
   9 of citric acid modified starch.

3. The mixed shrinkage reducing agent for concrete according to the claim 1, wherein, the alkali modified diatomite is prepared by the following method:
   dispersing diatomite in an aqueous alkaline solution having a pH of 10-11 and a volume of 5-10 times a volume of the diatomite, stirring at 40-50° C. for 20-30 minutes, washing with water until the pH value is less than 8, and naturally drying.

4. The mixed shrinkage reducing agent for concrete according to the claim 2, wherein, the alkali modified diatomite is prepared by the following method:
   dispersing diatomite in an aqueous alkaline solution having a pH of 10-11 and a volume of 5-10 times a volume of the diatomite, stirring at 40-50° C. for 20-30 minutes, washing with water until the pH value is less than 8, and naturally drying.

5. The mixed shrinkage reducing agent for concrete according to the claim 3, wherein, the aqueous alkaline solution is prepared by dissolving at least one selected from KOH, NaOH, $Na_2CO_3$, or $K_2CO_3$ in water.

6. The mixed shrinkage reducing agent for concrete according to the claim 4, wherein, the aqueous alkaline solution is prepared by dissolving at least one selected from KOH, NaOH, $Na_2CO_3$, or $K_2CO_3$ in water.

7. The mixed shrinkage reducing agent for concrete according to the claim 1, wherein, the citric acid modified starch is prepared by the following method:
   dissolving citric acid in water to prepare a solution with a concentration of 10-15 wt %, adding starch to the solution by a weight ratio of starch to citric acid of 1:(0.6-0.9), leaving the solution to react at 70-90° C. for 120-150 minutes, filtering the solution to provide a filtering residue, and drying the filtering residue at 60-75° C. for 5-8 hours.

8. The mixed shrinkage reducing agent for concrete according to the claim 2, wherein, the citric acid modified starch is prepared by the following method:
   dissolving citric acid in water to prepare a solution with a concentration of 10-15 wt %, adding starch to the solution by a weight ratio of starch to citric acid of 1:(0.6-0.9), leaving the solution to react at 70-90° C. for 120-150 minutes, filtering the solution to provide a filtering residue, and drying the filtering residue at 60-75° C. for 5-8 hours.

9. The mixed shrinkage reducing agent for concrete according to the claim 1, wherein, the citric acid modified starch is prepared by the following method:
   dissolving citric acid in water to prepare a solution with a concentration of 12-13 wt %, adding starch to the solution by a weight ratio of starch to citric acid of 1:0.75, leaving the solution to react at 75-80° C. for 140-150 minutes, filtering the solution to provide a filtering residue, and drying the filtering residue at 70-75° C. for 6-7 hours.

10. The mixed shrinkage reducing agent for concrete according to the claim 2, wherein, the citric acid modified starch is prepared by the following method:

dissolving citric acid in water to prepare a solution with a concentration of 12-13 wt %, adding starch to the solution by a weight ratio of starch to citric acid of 1:0.75, leaving the solution to react at 75-80° C. for 140-150 minutes, filtering the solution to provide a filtering residue, and drying the filtering residue at 70-75° C. for 6-7 hours.

11. The mixed shrinkage reducing agent for concrete according to the claim 1, further comprising the following components in parts by weight: 1-3 of calcium acetate.

12. The mixed shrinkage reducing agent for concrete according to the claim 2, further comprising the following components in parts by weight: 1-3 of calcium acetate.

13. The mixed shrinkage reducing agent for concrete according to the claim 1, wherein, the mixed shrinkage reducing agent for concrete has a particle size of 10-40 μm.

14. The mixed shrinkage reducing agent for concrete according to the claim 2, wherein, the mixed shrinkage reducing agent for concrete has a particle size of 10-40 μm.

15. A preparation method of the mixed shrinkage reducing agent for concrete according to claim 1, comprising the steps of:

step 1, uniformly mixing the alkali modified diatomite, the magnesium oxide, and the citric acid modified starch to obtain a mixture, and step 2, adding the borax, the sodium hexametaphosphate, and the vermiculite into the mixture obtained in step 1, fully mixing, and milling the mixture to a particle size of less than 40 μm to provide the mixed shrinkage reducing agent for concrete.

16. The preparation method according to claim 15, further comprising: adding calcium acetate to the mixture in step 2.

* * * * *